(12) United States Patent
Ishigure et al.

(10) Patent No.: US 11,673,597 B2
(45) Date of Patent: Jun. 13, 2023

(54) SWITCH DEVICE

(71) Applicant: KABUSHIKI KAISHA TOKAI RIKA DENKI SEISAKUSHO, Aichi (JP)

(72) Inventors: Nobuyuki Ishigure, Aichi (JP); Yuki Sato, Aichi (JP); Tadashi Usuya, Aichi (JP); Akio Nishiyama, Aichi (JP); Masahiro Kato, Aichi (JP); Takayuki Aoki, Toyota (JP); Shinji Matsubara, Toyota (JP); Toshihiko Kosugi, Toyota (JP); Ryusuke Ohta, Toyota (JP); Shinji Hara, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 176 days.

(21) Appl. No.: 17/189,078

(22) Filed: Mar. 1, 2021

(65) Prior Publication Data
US 2021/0276606 A1 Sep. 9, 2021

(30) Foreign Application Priority Data
Mar. 4, 2020 (JP) .............................. JP2020-036773

(51) Int. Cl.
*B60Q 1/26* (2006.01)
*B62D 1/04* (2006.01)
(Continued)

(52) U.S. Cl.
CPC .............. *B62D 1/046* (2013.01); *B60K 35/00* (2013.01); *B60K 37/06* (2013.01); *B60Q 1/1469* (2013.01);
(Continued)

(58) Field of Classification Search
CPC .. B60Q 1/0082; B60Q 1/1453; B60Q 1/1461; B60Q 1/1469; B60Q 1/1476;
(Continued)

(56) References Cited

U.S. PATENT DOCUMENTS 6,246,129 B1 * 6/2001 Schaefer .............. B60Q 1/1476
200/61.54
6,437,264 B1 * 8/2002 Mizuta ................. B60Q 1/1461
200/61.54
(Continued)

FOREIGN PATENT DOCUMENTS

JP 2003-118416 A 4/2003
JP 2013157107 A 8/2013
JP 2019-156096 A 9/2019

*Primary Examiner* — Brian J McGovern
(74) *Attorney, Agent, or Firm* — Tarolli, Sundheim, Covell & Tummino LLP

(57) ABSTRACT

A switch device includes a switch body, which is arranged at the back side of a steering unit, and a lever unit, which is attached to the switch body to allow for switching by a pivotal operation about a first axis, which extends in the axial direction of a steering shaft. The lever unit includes a lever shaft, which extends in a direction intersecting the first axis of the pivotal operation, a lever head, which is arranged at the distal end of the lever shaft and has a larger dimension than the diameter of the lever shaft, and a push operation unit, which allows for switching by a push operation. The push operation unit is arranged so that the operation direction of the push operation is directed toward the first axis.

5 Claims, 9 Drawing Sheets

(51) Int. Cl.
  *B60K 35/00* (2006.01)
  *B60Q 1/14* (2006.01)
  *B60K 37/06* (2006.01)
  *B60Q 1/00* (2006.01)
  *G05G 1/04* (2006.01)
  *G05G 1/06* (2006.01)
  *G05G 5/03* (2008.04)
  *G05G 5/06* (2006.01)

(52) U.S. Cl.
  CPC ...... *B60K 2370/782* (2019.05); *B60Q 1/0082* (2013.01); *B60Q 1/1484* (2013.01); *G05G 1/04* (2013.01); *G05G 1/06* (2013.01); *G05G 5/03* (2013.01); *G05G 5/06* (2013.01)

(58) Field of Classification Search
  CPC ...... B60Q 1/1484; B62D 1/046; B60K 37/06; B60K 2370/782; G05G 1/04; G05G 5/03; G05G 5/06; G05G 2009/04774
  See application file for complete search history.

(56) References Cited

U.S. PATENT DOCUMENTS

| | | | |
|---|---|---|---|
| 2003/0019731 A1* | 1/2003 | Liburdi | B60Q 1/1469 200/61.54 |
| 2015/0059509 A1* | 3/2015 | Pohanka | G05G 1/01 74/473.3 |
| 2018/0086206 A1* | 3/2018 | Mizuno | B60Q 1/1469 |

\* cited by examiner

SWITCH DEVICE

RELATED APPLICATIONS

The present invention is a Nonprovisional Application under 35 USC 111(a), claiming priority to Serial No. JP 2020-036773, filed on 4 Mar. 2020, the entirety of which is incorporated herein by reference.

BACKGROUND

1. Field

The following description relates to a switch device.

2. Description of Related Art

A known lever combination switch having multiple switching functionalities is used as a switch device that is operated to actuate vehicle onboard units (refer to, for example, Japanese Laid-Open Patent Publication No. 2013-157107). Examples of switch functionalities of the lever combination switch include a turn signal switch, a light switch, a dimmer switch, a wiper switch, and a washer switch.

The lever combination switch may include push buttons that activate some of the switching functionalities. In this case, when operating a push button, a lever may also be inadvertently moved thereby resulting in an erroneous operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect of the present description, a lever-type switch device includes multiple switching functionalities for operating multiple vehicle onboard units. The switch device includes a switch body arranged at a back side of a steering unit that is rotated to steer a vehicle, and a lever unit attached to the switch body to allow for switching by a pivotal operation about an axis that extends in an axial direction of a rotary shaft of the steering unit. The lever unit includes a lever shaft extending in a direction intersecting the axis of the pivotal operation, a lever head arranged at a distal end of the lever shaft and having a larger dimension than a diameter of the lever shaft, and a push operation unit arranged on the lever head to allow for switching by a push operation. The push operation unit is arranged so that an operation direction of the push operation is directed toward the axis.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A switch device according to one embodiment will now be described with reference to the drawings.

Figure 1:
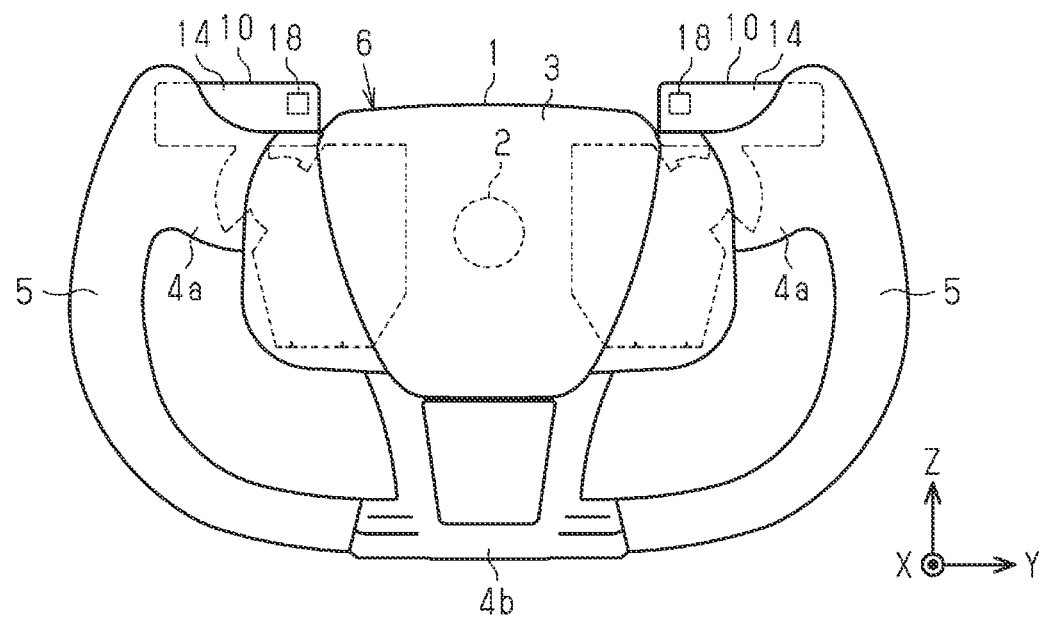
FIG. 1 is a front view showing an irregularly-shaped steering unit.

As shown in FIG. 1, an irregularly-shaped steering unit 1 that is operated to steer the vehicle is arranged near a driver seat. The irregularly-shaped steering unit 1 is rotationally coupled to the vehicle body by a steering shaft 2, which is coaxial with the steering unit 1. The steering shaft 2 corresponds to a rotary shaft of the irregularly-shaped steering unit 1. In the axial direction of the steering shaft 2, the back side is directed toward the vehicle body, and the front side is opposite to the back side. The front side of the irregularly-shaped steering unit 1 is opposed toward a user who performs steering. A width direction and a height direction of irregularly-shaped steering unit 1 are orthogonal to each other and to the axial direction. In FIG. 1, the axial direction, the width direction, and the height direction are indicated as the X-axis direction, the Y-axis direction, and the Z-axis direction, respectively.

The irregularly-shaped steering unit 1 includes a hub 3 connected to the steering shaft 2 and two grips 5 arranged near the hub 3. The irregularly-shaped steering unit 1 also includes two spokes 4a, arranged at opposite sides of the hub 3 in the width direction of the irregularly-shaped steering unit 1, and a spoke 4b, arranged at the lower side of the hub 3 in the height direction of the irregularly-shaped steering unit 1. In one example, the irregularly-shaped steering unit 1 includes the two spokes 4a coupled to the two ends of the hub 3 in the width direction of the irregularly-shaped steering unit 1 and the spoke 4b coupled to the lower end of the hub 3 in the height direction of the irregularly-shaped steering unit 1. The spokes 4a and the spoke 4b connect the hub 3 and the grips 5.

The hub 3, the spokes 4a, the spoke 4b, and the two grips 5 form a peripheral portion 6 of the irregularly-shaped steering unit 1. The peripheral portion 6 defines the contour of the irregularly-shaped steering unit 1 in a front axial view. The peripheral portion 6 of the present embodiment is longer in the width direction and shorter in the height direction. In this manner, the irregularly-shaped steering unit 1 is a steering wheel having dimensions that differ in the width direction and the height direction when viewed in the axial direction. That is, the irregularly-shaped steering unit 1 has a shape that is noncircular. The irregularly-shaped steering unit 1 may be shaped to be elliptic.

The two grips 5 of the present embodiment are arranged at opposite sides of the irregularly-shaped steering unit 1 in the width direction. The two grips 5 form a non-annular shape that does not include an upper portion and a lower portion in the height direction. The grips 5 are connected by the spoke 4b to the lower side of the hub 3. The hub 3 and the spoke 4b form the lower part of the peripheral portion 6. The upper sides of the grips 5 are connected to the hub 3 by the spokes 4a. The hub 3, the spokes 4a, and the grips 5 form the upper part of the peripheral portion 6. The grips 5 at opposite sides of the peripheral portion 6 in the width direction form the side parts of the peripheral portion 6. In one example, a first end of each grip 5 is coupled to the corresponding one of the spokes 4a, and a second end of each grip 5 is coupled to the spoke 4b.

Two switch devices 10 that are operated to actuate vehicle onboard units are arranged proximate to the irregularly-shaped steering unit 1. The switch devices 10 are arranged in a substantially symmetrical manner at a back side of the irregularly-shaped steering unit 1. Each switch device 10 is used to operate multiple vehicle onboard units. Examples of the vehicle onboard units include a turn signal device, a light device, a fog lamp device, a front wiper device, a rear wiper device, and a mist washer device. The axial direction, the width direction, and the height direction of the irregularly-shaped steering unit 1 correspond to the axial direction, the width direction, and the height direction of each switch device 10.

Figure 2:
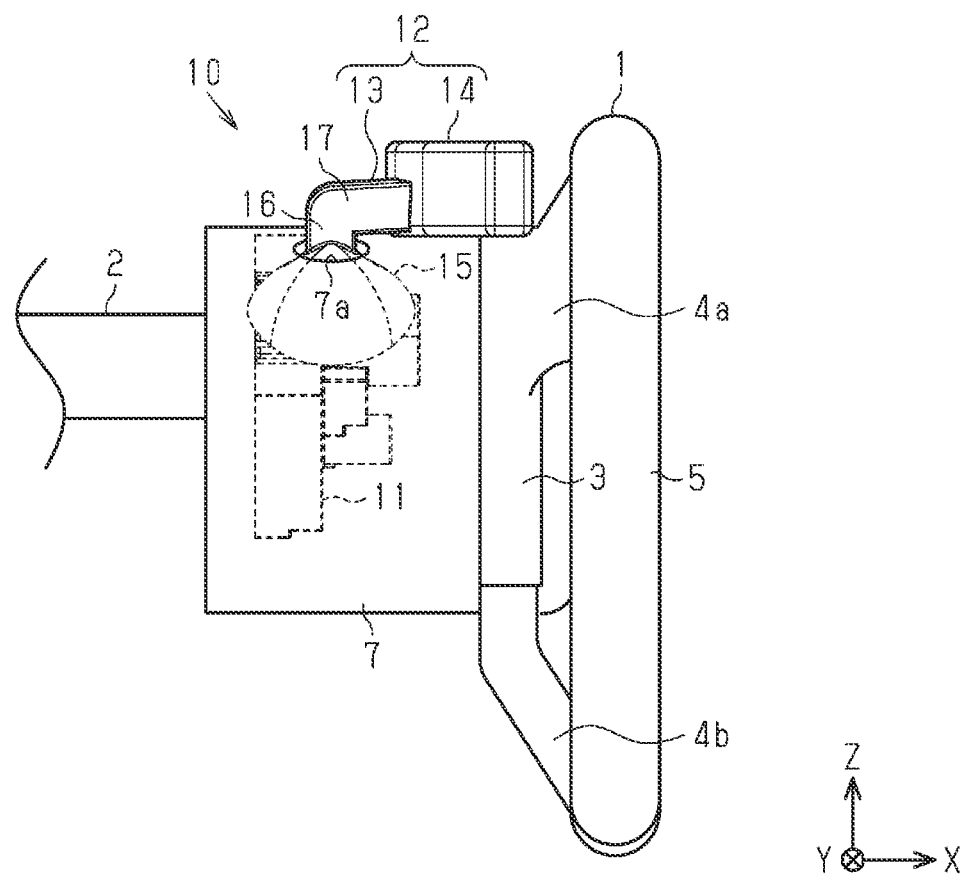
FIG. 2 is a side view showing the irregularly-shaped steering unit.

As shown in FIG. 2, the irregularly-shaped steering unit 1 includes a back cover 7 at the back side of the hub 3. The back cover 7 is, for example, hollow and surrounds the steering shaft 2. Further, the back cover 7 forms the rear shell of the irregularly-shaped steering unit 1.

Figure 3:
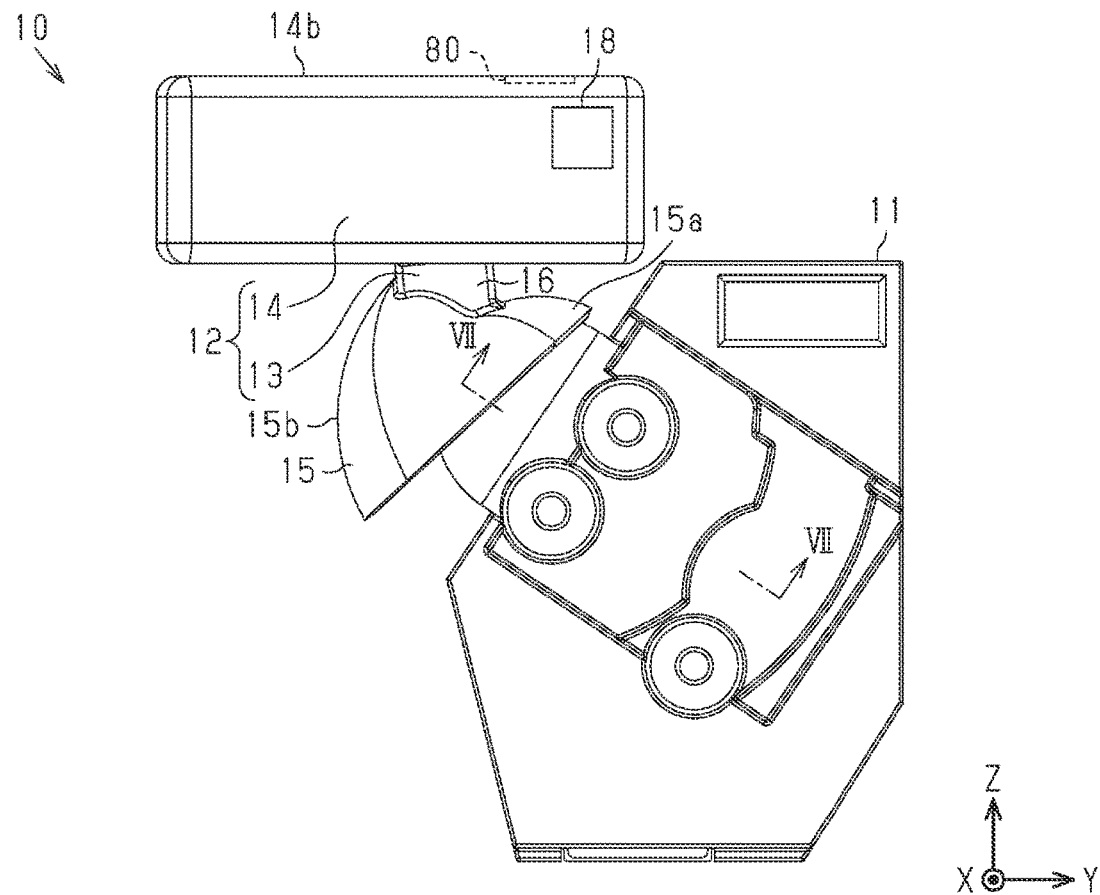
FIG. 3 is a front view showing a switch device.

As shown in FIGS. 2 and 3, the switch device 10 includes a switch body 11, which is attached to and rotated integrally with the irregularly-shaped steering unit 1, and a lever unit 12, which is held pivotally about the switch body 11. The switch body 11 is accommodated in the back cover 7. The lever unit 12 projects out of an insertion hole 7a, which extends through the back cover 7, in the radial direction of the steering shaft 2. The lever unit 12 is arranged to pivot about the switch body 11 and the irregularly-shaped steering unit 1. The lever unit 12 is assigned a switching functionality that switches contact points. The insertion hole 7a has a greater diameter than the lever unit 12 to allow the lever unit 12 to be pivoted.

The lever unit 12 includes a lever shaft 13 extending from the switch body 11 and a hammer-shaped lever head 14 connected to the switch body 11 by the lever shaft 13. A guard 15 is arranged in the insertion hole 7a around the lever shaft 13. In one example, the lever unit 12 includes the guard 15 arranged around the end of the lever shaft 13 that is closer to the switch body 11. In one example, part of the guard 15 is accommodated in the back cover 7 and another part of the guard 15 is positioned in the insertion hole 7a. The guard 15 is umbrella-shaped and open toward the switch body 11. The umbrella-shaped portion of the guard 15 has a greater diameter than the insertion hole 7a of the back cover 7.

The lever shaft 13 includes a base 16, which is connected to the switch body 11 and projects upward from the switch body 11, and an arm 17, which extends in the axial direction from the base 16. Accordingly, the lever shaft 13 is bent at a position located radially outward from the back cover 7. The guard 15 is arranged around the base 16. The arm 17 extends along the back cover 7 from the back side toward the front side of the irregularly-shaped steering unit 1. The lever head 14 is arranged at the end of the front side of the arm 17.

Figure 4:
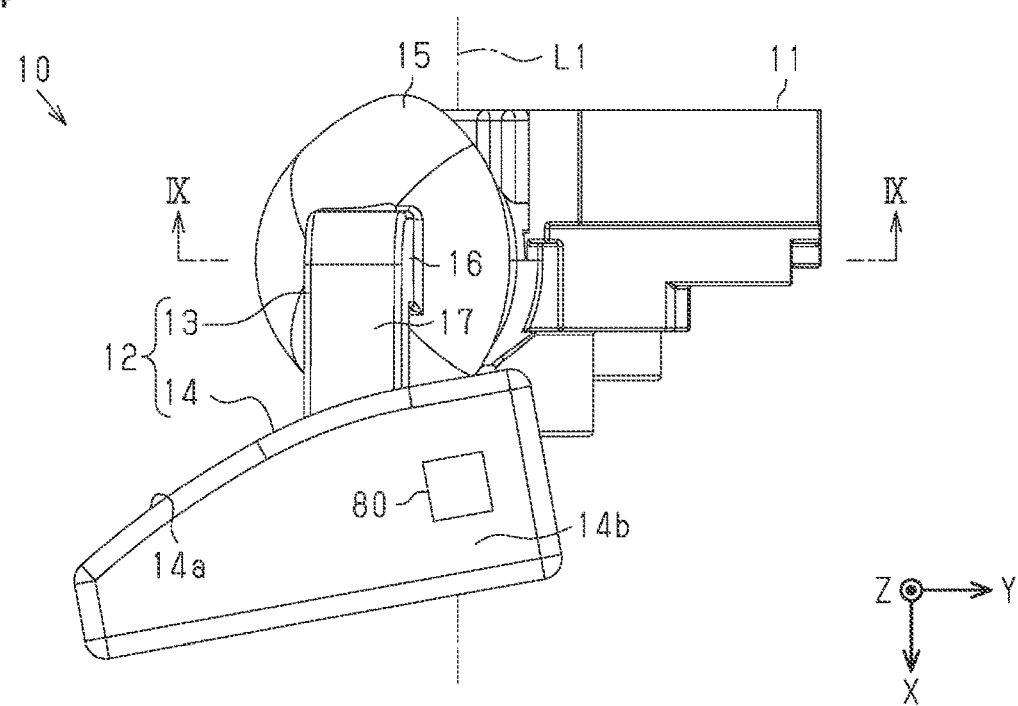
FIG. 4 is a top view showing the switch device.

As shown in FIGS. 3 and 4, the lever head 14 extends from the lever shaft 13 in a direction that intersects the axial direction. In other words, the arm 17 of the lever shaft 13 and the lever head 14 intersect each other in a substantially T-shaped manner. The lever head 14 of the present embodiment extends from the lever shaft 13 in the width direction of the irregularly-shaped steering unit 1. The lever head 14 is shaped to be larger than the diameter of the lever shaft 13. The diameter of the lever shaft 13 is, for example, the dimension of the lever shaft 13 in the direction that intersects the direction in which the lever shaft 13 extends. In one example, the diameter of the lever shaft 13 is the dimension of the lever shaft 13 in the direction orthogonal to the direction in which the lever shaft 13 extends. The lever head 14 extends further in the radial direction of the steering shaft 2 than the lever shaft 13.

The lever head 14 extends away from the steering shaft 2 in the width direction of the irregularly-shaped steering unit 1. More specifically, the lever head 14 is inclined so that the outward portion in the width direction is located frontward from the inward portion with respect to the axial direction. Further, the lever head 14 is arranged diagonally relative to the axial direction, and a back surface 14a of the lever head 14 is narrowed outward in the width direction of the lever head 14 with respect to the axial direction.

As shown in FIG. 1, the lever units 12 do not project outward from the peripheral portion 6 of the irregularly-shaped steering unit 1 in the width direction. The lever units 12 project outward from the peripheral portion 6 in the height direction. The lever units 12 of the present embodiment project upward and outward from the upper part of the peripheral portion 6 in the height direction. The lever units 12 are arranged downward from the upper ends of the grips 5. That is, the lever units 12 are formed so as not to extend outward from the grips 5 but are partially exposed to the front side of the irregularly-shaped steering unit 1.

In the present embodiment, the lever heads 14 are partially exposed to the front side of the irregularly-shaped steering unit 1 in the axial direction. The lever heads 14 each include a display 18 that displays the switching functionality on an exposed front surface. The display 18 displays, for example, an operation direction for the turn signal device or the wiper device.

Figure 5:
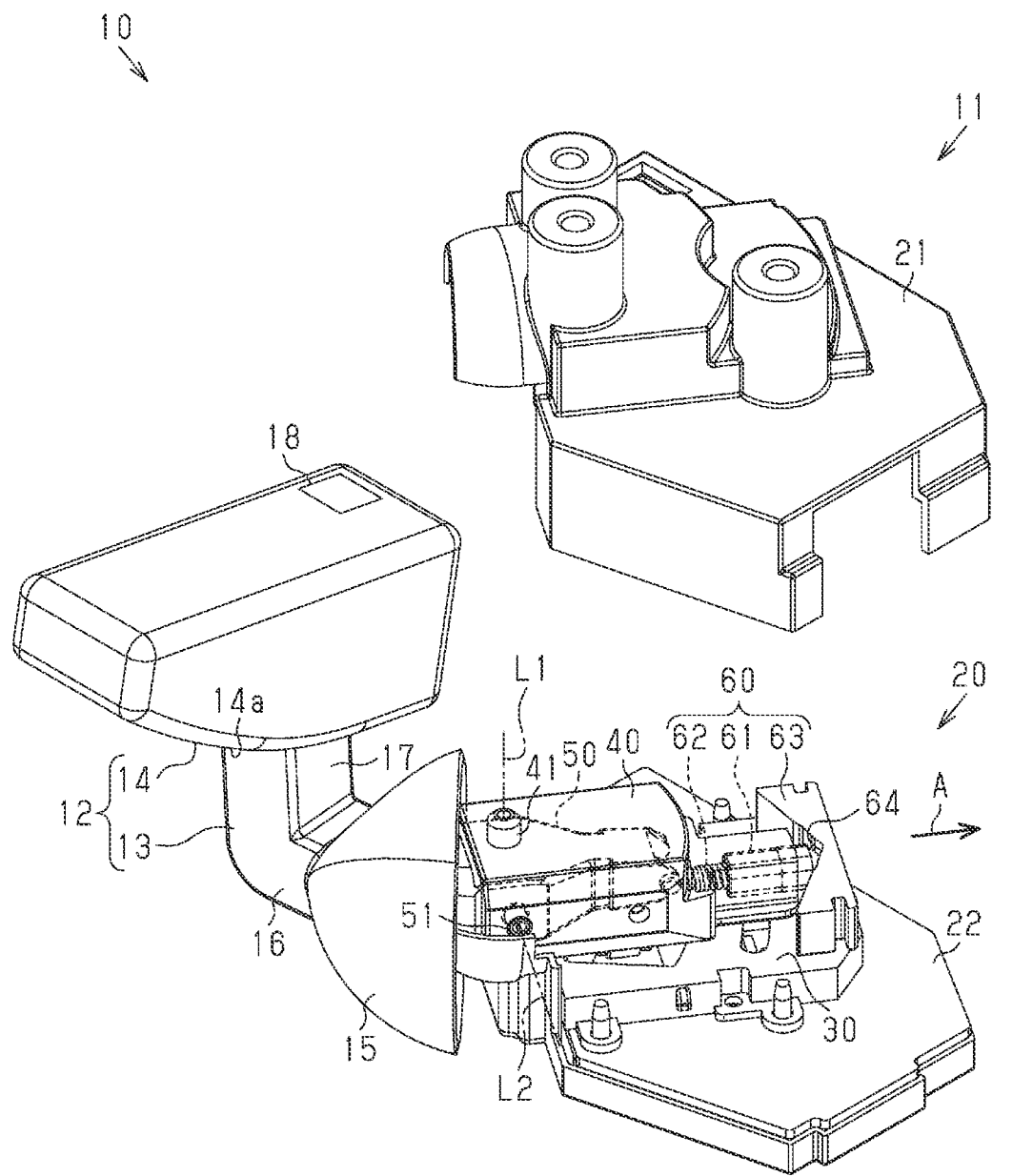
FIG. 5 is an exploded perspective view showing the inner portion of a switch body.

As shown in FIG. 5, the switch body 11 includes an upper case 21 and a lower case 22 that are opposed toward each other in the axial direction of the steering shaft 2. In a state in which the upper case 21 is attached to the irregularly-shaped steering unit 1, the upper case 21 is directed toward the front side in the axial direction. The lower case 22 is directed toward the back side in the axial direction. The upper case 21 and the lower case 22 accommodate a switch mechanism 20 that supports the lever unit 12 in a pivotal manner.

Figure 6:
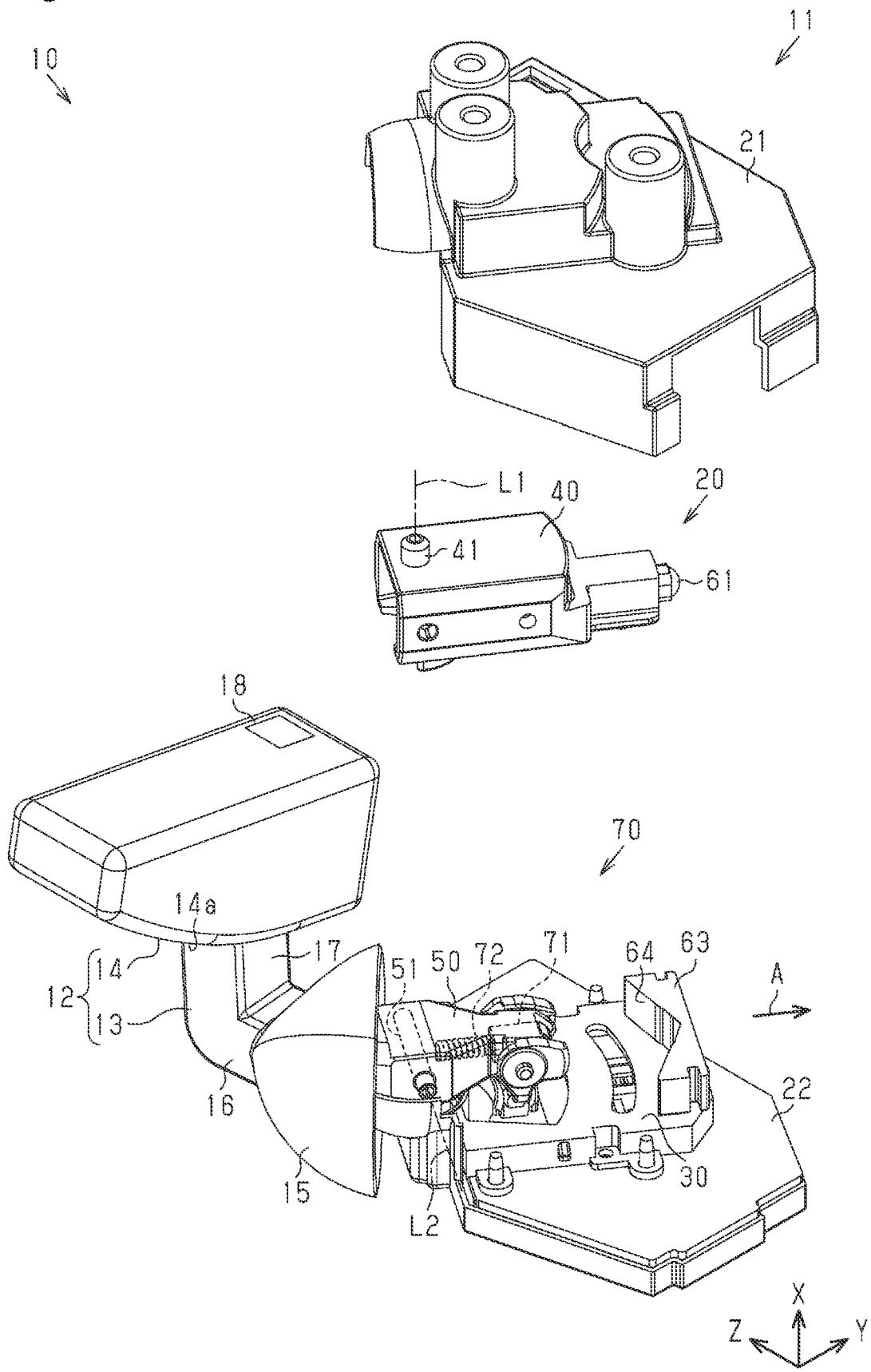
FIG. 6 is an exploded perspective view showing a first pivoting unit and a second pivoting unit.
Figure 7:
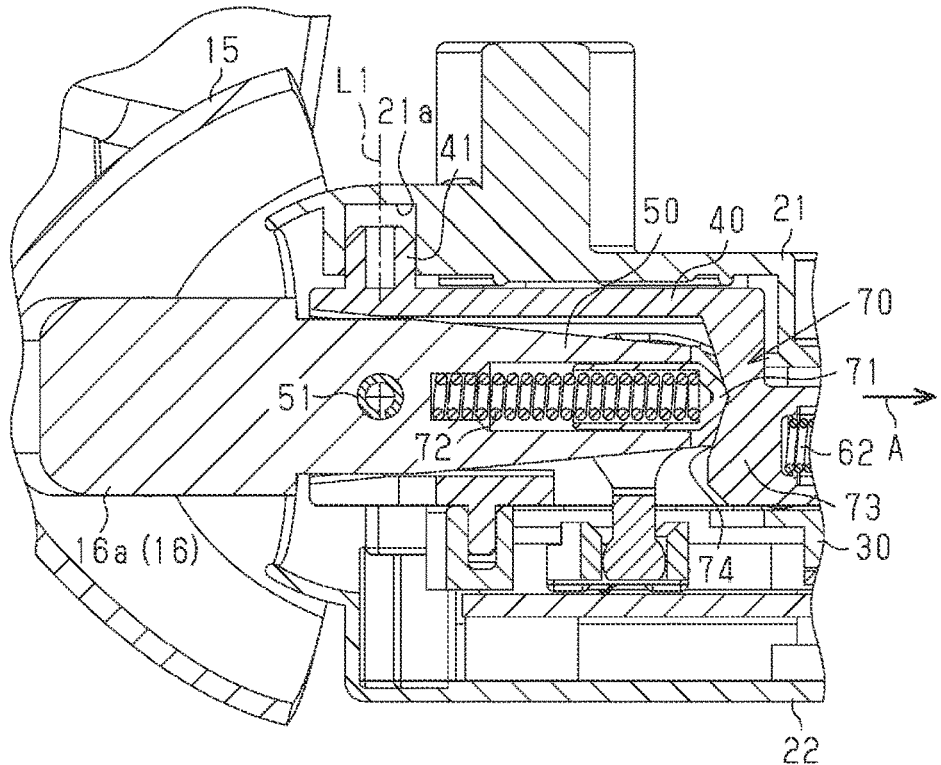
FIG. 7 is a cross-sectional view taken along line VII-VII in FIG. 3.

As shown in FIGS. 5 to 7, the switch mechanism 20 includes a base unit 30 engaged with the lower case 22, a first pivoting unit 40 supported by the upper case 21, and a second pivoting unit 50 pivotally supported about the first pivoting unit 40. The switch mechanism 20 is connected to the lever unit 12 in a connection direction A, and the first pivoting unit 40 and the second pivoting unit 50 are arranged to extend in the connection direction A. In the present embodiment, the connection direction A is orthogonal to the axial direction and extends diagonally relative to the width direction and the height direction. The switch mechanism 20 supports the lever unit 12 pivotally about two directions that are orthogonal to the connection direction A.

The first pivoting unit 40 includes a projection 41 projecting toward the upper case 21. The upper case 21 includes a fitting hole 21a into which the projection 41 is fitted. The first pivoting unit 40 and the second pivoting unit 50 are supported by the upper case 21 pivotally about a first axis L1 by fitting the projection 41 to the fitting hole 21a. The first axis L1 extends in the axial direction of the steering shaft 2. The first axis L1 corresponds to "the pivotal operation axis" of the lever unit 12.

As shown in FIGS. 5 and 6, the second pivoting unit 50 is fitted into and coupled to the first pivoting unit 40. The proximal side of the second pivoting unit 50 is connected to the base 16 of the lever shaft 13 in the connection direction A. In one example, the proximal end of the second pivoting unit 50 is connected to the base 16 of the lever shaft 13. A through shaft 51 extends through the first pivoting unit 40 and the second pivoting unit 50. The through shaft 51 pivotally supports the second pivoting unit 50 on the first pivoting unit 40. The through shaft 51 is arranged at the proximal side of the second pivoting unit 50 in the connection direction A. In one example, the through shaft 51 extends along a second axis L2 at the proximal end of the second pivoting unit 50. Accordingly, the second pivoting unit 50 is supported by the first pivoting unit 40 pivotally about the second axis L2. The second axis L2 is orthogonal to the first axis L1.

As described above, the lever unit 12 is supported on the switch body 11 pivotally about the first axis L1 and the second axis L2 by the first pivoting unit 40 and the second pivoting unit 50 of the switch mechanism 20. When the lever unit 12 is operated to pivot about the second axis L2, only the second pivoting unit 50 is pivoted and the first pivoting unit 40 is not pivoted. When the lever unit 12 is operated to pivot about the first axis L1, the first pivoting unit 40 and the second pivoting unit 50 are both pivoted. The lever head 14 of the lever unit 12 is operated to pivot about the first axis L1 upward or downward in the height direction and is also operated to pivot about the second axis L2 backward or frontward in the axial direction. The pivotal operation about the first axis L1 corresponds to a pivotal operation about the axis of the steering shaft 2, and the pivotal operation about the second axis L2 corresponds to a pivotal operation about a direction that intersects the axis of the steering shaft 2.

Figure 8:
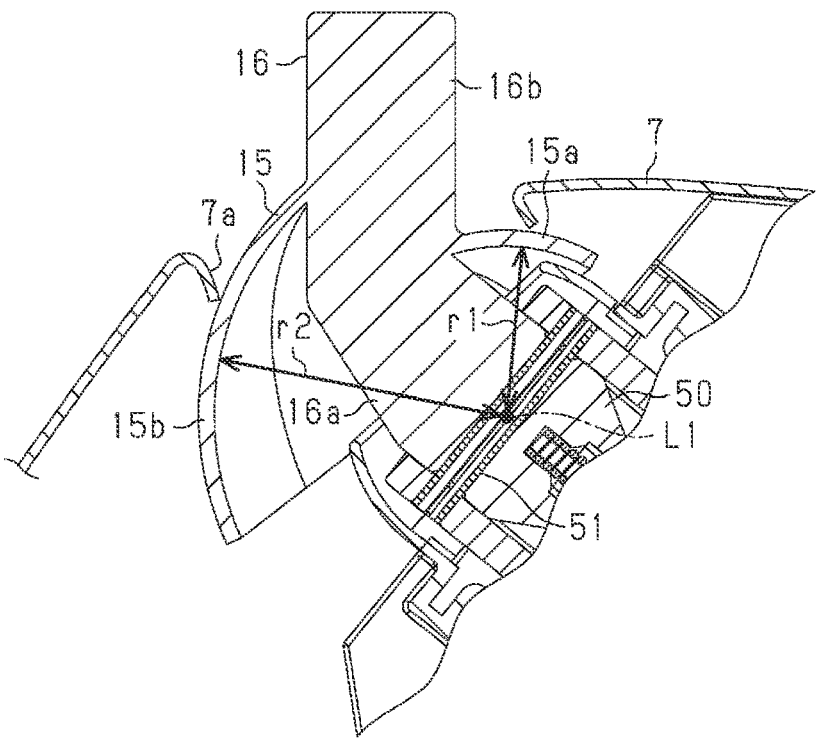
FIG. 8 is a cross-sectional view taken along line IX-IX in FIG. 4.

As shown in FIG. 8, the base 16 of the lever shaft 13 includes a connection portion 16a connected to the second pivoting unit 50 and a projection portion 16b projecting from the connection portion 16a out of the back cover 7. The connection portion 16a extends in the connection direction A along the second pivoting unit 50. The projection portion 16b extends upward in the height direction. In this manner, the base 16 is arranged to extend in the connection direction A and bent in the height direction. The projection portion 16b extends through the insertion hole 7a of the back cover 7 and projects out of the back cover 7.

In a cross-sectional plane orthogonal to the axial direction, the guard 15 arranged around the base 16 includes a first arcuate portion 15a, which has radius r1 and extends about the first axis L1, and a second arcuate portion 15b, which has radius r2 and extends about the first axis L1. In this manner, the guard 15 is stepped at different positions on the base 16. The first arcuate portion 15a and the second arcuate portion 15b are arcuate and extend about the first axis L1 so that the gap between the back cover 7 and the guard 15 is not enlarged when the lever unit 12 is pivoted about the first axis L1.

As shown in FIGS. 2 to 4, the guard 15 is curved between the first arcuate portion 15a and the second arcuate portion 15b. The guard 15 is umbrella-shaped in its entirety. The umbrella-shaped portion of the guard 15 has a greater diameter than the insertion hole 7a of the back cover 7. In this manner, the guard 15 closes the insertion hole 7a and conceals the switch body 11 in the back cover 7.

As shown in FIG. 5, the switch mechanism 20 includes a detent mechanism 60 at the distal side of the first pivoting unit 40 in the connection direction A. The detent mechanism 60 produces resistance when the lever unit 12 is operated. In one example, the detent mechanism 60 is arranged at the distal end of the first pivoting unit 40. The detent mechanism 60 includes an abutment portion 61 that projects out of the distal end of the first pivoting unit 40 and an urging member 62 that urges the abutment portion 61 toward the distal side in the connection direction A. The detent mechanism 60 also includes an opposing wall 63 arranged on the base unit 30 and opposed toward the abutment portion 61. The surface of the opposing wall 63 opposed toward the abutment portion 61 is inclined and recessed in the connection direction A of the first pivoting unit 40 and defines an inclined surface 64. The inclined surface 64 is inclined to form a substantially triangular shape. The detent mechanism 60 produces resistance when the lever unit 12 is operated about the first axis L1.

As shown in FIGS. 6 and 7, the switch mechanism 20 includes a detent mechanism 70 at the distal side of the second pivoting unit 50 in the connection direction A. The detent mechanism 70 produces resistance when the lever unit 12 is operated. In one example, the detent mechanism 70 is arranged at the distal end of the second pivoting unit 50. The detent mechanism 70 includes an abutment portion 71 that is arranged at the distal end of the second pivoting unit 50 and an urging member 72 that urges the abutment portion 71 toward the distal side in the connection direction A. The detent mechanism 70 also includes an opposing wall 73 arranged inside the first pivoting unit 40 and opposed toward the abutment portion 71. The surface of the opposing wall 73 opposed toward the abutment portion 71 defines an inclined surface 74 inclined in a direction orthogonal to the inclined surface 64 of the detent mechanism 60. The detent mechanism 70 produces resistance when the lever unit 12 is operated about the second axis L2.

The movement of the detent mechanisms 60, 70 when the lever unit 12 is operated about the first axis L1 will now be described. The detent mechanisms 60, 70 are moved based on the same principle. Thus, movement of the detent mechanism 70 when the lever unit 12 is operated about the second axis L2 will not be described.

Figure 9A:
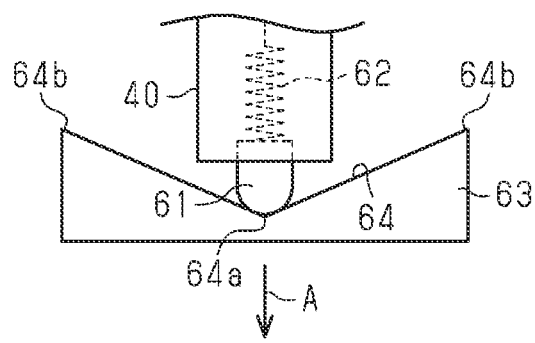
FIG. 9A is a schematic diagram illustrating the movement of a detent mechanism.

As shown in FIG. 9A, a central portion 64a of the inclined surface 64 in a direction orthogonal to the connection direction A is located toward the distal side in the connection direction A from end portions 64b of the inclined surface 64 in the orthogonal direction. When the first pivoting unit 40 is located at an initial position prior to pivoting, the abutment portion 61 is pressed toward the distal side in the connection direction A against the central portion 64a of the inclined surface 64. This holds the first pivoting unit 40 at the initial position on the base unit 30.

Figure 9B:
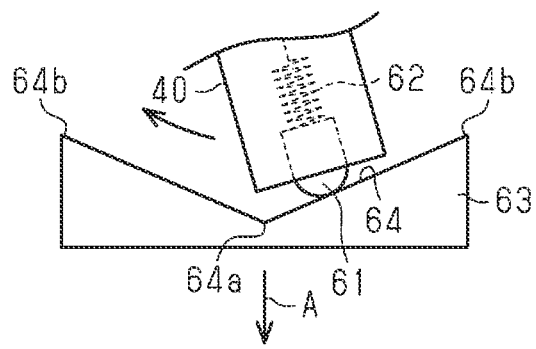
FIG. 9B is a schematic diagram illustrating the movement of the detent mechanism.

As shown in FIG. 9B, when the lever unit 12 is operated and pivoted about the first axis L1, the abutment portion 61 slides on the inclined surface 64 and moves from the position on the central portion 64a to a position located toward an end portion 64b of the inclined surface 64. In this case, the abutment portion 61 is pressed by the inclined surface 64 toward the proximal side in the connection direction A and is moved toward the proximal side of the first pivoting unit 40 against the urging force of the urging member 62. The urging force of the urging member 62 allows the first pivoting unit 40 to produce resistance perceived by the user who is operating the lever unit 12.

When the lever unit 12 is no longer operated, the urging force of the urging member 62 forces the abutment portion 61 to slide from near the end portion 64b of the inclined surface 64 toward the central portion 64a. This returns the lever unit 12 to the initial position together with the first pivoting unit 40. That is, the lever unit 12 is of a momentary type in which the detent mechanism 60 returns the lever unit 12 to the initial position. The lever unit 12 may be of a stationary type in which the detent mechanism 60 holds the lever unit 12 at a predetermined position.

As shown in FIG. 4, the switch device 10 includes a push operation unit 80 that is arranged on the lever unit 12 and allows for a push operation. The push operation unit 80 has a predetermined switching functionality.

The lever head 14 extends in the width direction of the irregularly-shaped steering unit 1. The push operation unit 80 is arranged on the upper side of the lever head 14 in the height direction, that is, on a top surface 14b of the lever head 14, and pushed toward the lower side in the height direction. The push operation unit 80 is also located upward in the height direction from the first axis L1. Thus, the push operation unit 80 is operated in a direction extending toward the first axis L1. The operation direction extending toward the first axis L1 means that, for example, an angle formed by the operation direction and a line connecting the push operation unit 80 and the first axis L1 is in a predetermined angular range. The predetermined angular range is set so that the lever unit 12 will not be pivoted when the push operation unit 80 is pushed. In one example, the push operation unit 80 of the lever head 14 and the switch mechanism 20 may be located at different positions in the direction of the first axis L1. In one example, in a view taken in the direction in which the first axis L1 extends, an angle formed by the operation direction of the push operation unit 80 and the line connecting the push operation unit 80 and the first axis L1 is set in the predetermined angular range.

Figure 10:
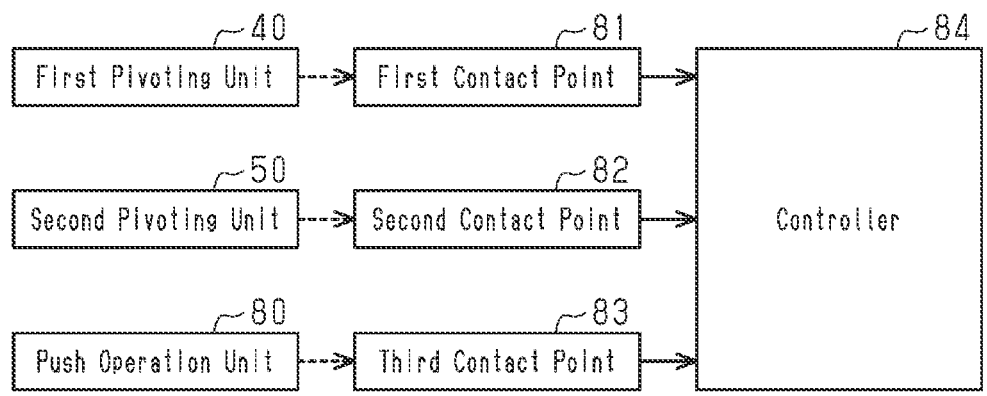
FIG. 10 is a block diagram showing the electric system of the switch device.

As shown in FIG. 10, the switch device 10 includes a first contact point 81 that is opened and closed by the first pivoting unit 40, a second contact point 82 that is opened and closed by the second pivoting unit 50, a third contact point 83 that is opened and closed by the push operation unit 80, and a controller 84 that controls switching of functionalities. The first contact point 81 is switched between open and closed states when the first pivoting unit 40 is pivoted about the first axis L1. The second contact point 82 is switched between open and closed states when the second pivoting unit 50 is pivoted about the second axis L2. The third contact point 83 is switched between open and closed states when the push operation unit 80 is pushed. The controller 84 controls the functionalities of vehicle onboard units that are assigned to the first contact point 81, the second contact point 82, and the third contact point 83 based on the open and closed states of the first contact point 81, the second contact point 82, and the third contact point 83.

The operation of the present embodiment will now be described.

Figure 11A:
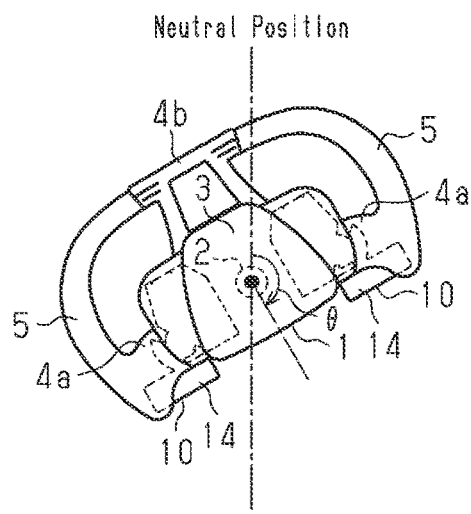
FIG. 11A is a diagram showing a right turning operation of the irregularly-shaped steering unit.
Figure 11B:
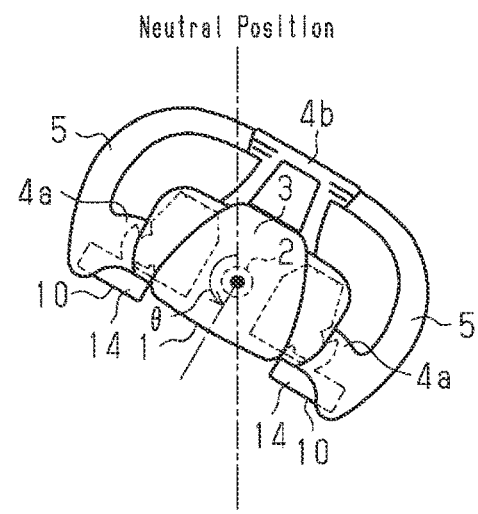
FIG. 11B is a diagram showing a left turning operation of the irregularly-shaped steering unit.

As shown in FIGS. 11A and 11B, the irregularly-shaped steering unit 1 can be turned rightward and leftward from a neutral position. FIG. 11A is a diagram showing the irregularly-shaped steering unit 1 turned rightward from the neutral position, and FIG. 11B is a diagram showing the irregularly-shaped steering unit 1 turned leftward from the neutral position. The irregularly-shaped steering unit 1 of the present embodiment cannot be rotated rightward or leftward from the neutral position a multiple number of full rotations. That is, the irregularly-shaped steering unit 1 has a rotation angle limit that allows for less than a single rotation in the rightward and leftward directions. Preferably, the maximum rotation angle θ of the irregularly-shaped steering unit 1 is, for example, approximately 150 to 160 degrees.

The switch device 10 according to the present embodiment is attached to the irregularly-shaped steering unit 1 and rotated integrally with the irregularly-shaped steering unit 1. Thus, the positional relationship of the irregularly-shaped steering unit 1 and the switch device 10 is always the same regardless of the position of the irregularly-shaped steering unit 1. This facilitates operation of the switch device 10 while gripping the irregularly-shaped steering unit 1.

Figure 12:
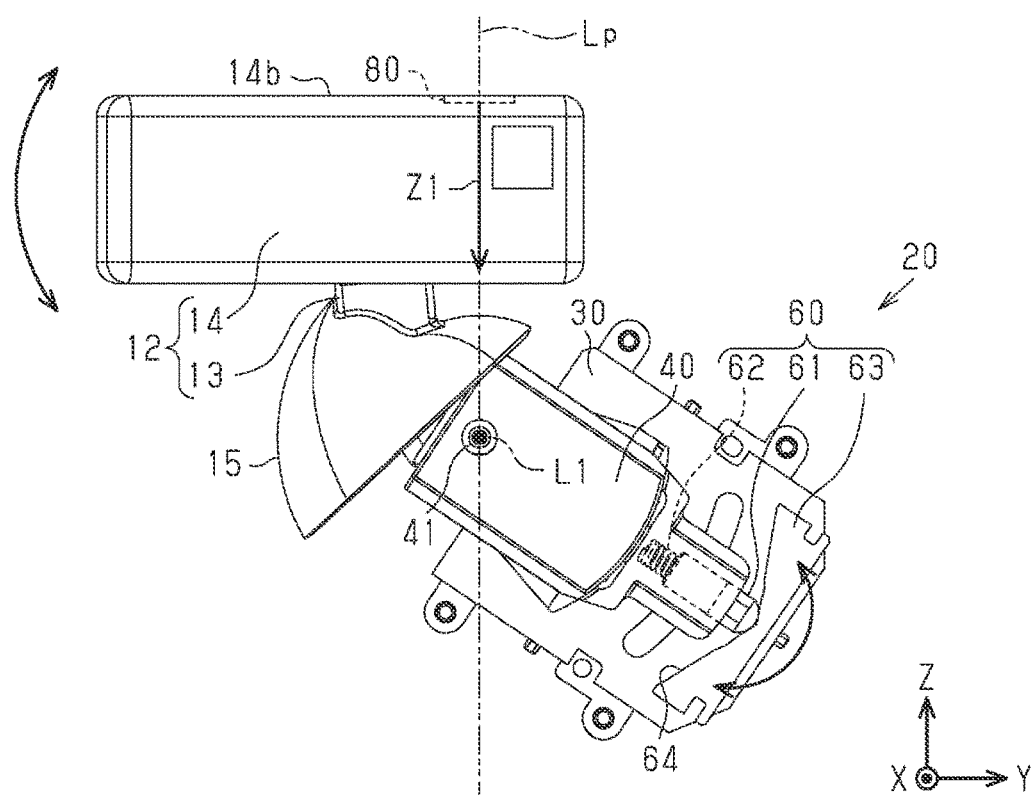
FIG. 12 is a front view showing an action of a push operation unit.
Figure 13:
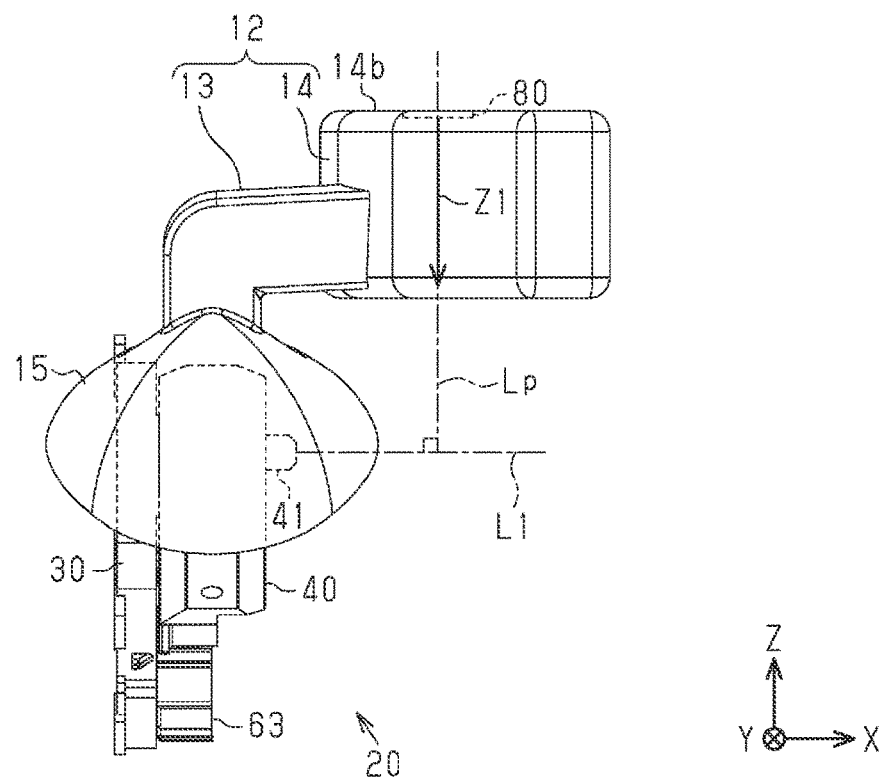
FIG. 13 is a side view showing the action of the push operation unit.

As shown in FIGS. 12, and 13, the push operation unit 80 is operated in an operation direction Z1. A line connecting the push operation unit 80 and the first axis L1 is referred to as a perpendicular line Lp. The perpendicular line Lp is orthogonal to the first axis L1 and extends in the radial direction of the first axis L1. The operation direction Z1 of the push operation unit 80 and the perpendicular line Lp will now be described.

Figure 14:
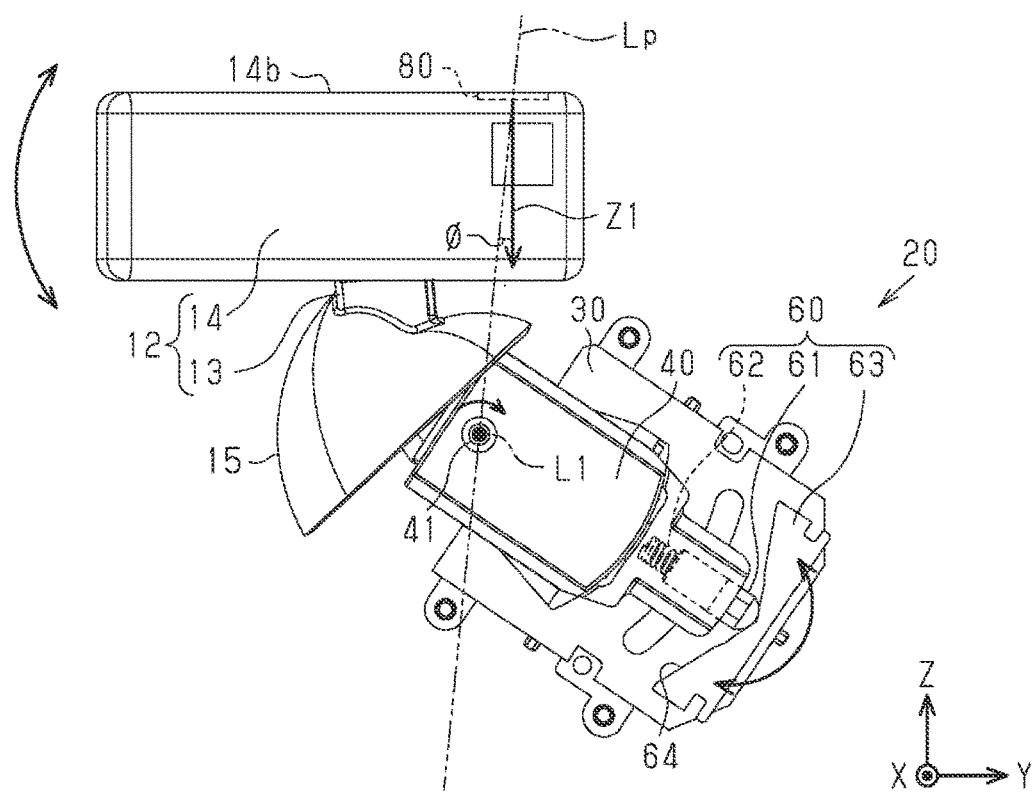
FIG. 14 is a diagram illustrating an angle formed by an operation direction and the perpendicular line in a diagonal relationship.

As shown in FIG. 14, if the push operation unit 80 and the first axis L1 were to be located at different positions in the width direction, the perpendicular line Lp and the operation direction Z1 would be in a diagonal relationship. In FIG. 14, the push operation unit 80 is arranged inward from the first axis L1 in the width direction. In this case, an angle formed by the perpendicular line Lp and the operation direction Z1 is referred to as angle φ.

When the push operation unit 80 is operated in the operation direction Z1, force resulting from angle φ and applied to the lever unit 12 will generate force acting in the circumferential direction about the first axis L1. The force acting in the circumferential direction decreases as angle φ decreases. The detent mechanism of the lever unit 12 produces operation resistance against a pivotal operation or the like of the lever unit 12. Thus, the lever unit 12 is not pivoted as long as the force acting in the circumferential direction does not exceed the operation resistance. Accordingly, the push operation unit 80 is preferably arranged so that angle φ is set in a predetermined angular range. The predetermined angular range is set so that the lever unit 12 is not pivoted when the push operation unit 80 is pushed.

As shown in FIGS. 12 and 13, in the present embodiment, the perpendicular line Lp and the operation direction Z1 extend in the height direction. Thus, the perpendicular line Lp and the operation direction Z1 extend in the same direction, that is, angle φ is 0°. When the push operation unit 80 is operated in the operation direction Z1, the force applied to the lever unit 12 acts along the first axis L1 of the lever unit 12. Thus, the force applied to the push operation unit 80 will not generate rotation moment at the lever unit 12. This maintains the position of the lever unit 12 and prevents an erroneous operation of the lever unit 12 when the push operation unit 80 is operated.

The first pivoting unit 40 includes the detent mechanism 60. The urging force of the urging member 62 allows the detent mechanism 60 to produce resistance against a pivotal operation about the first axis L1. In this manner, the detent mechanism 60 produces operation resistance against a pivotal operation about the first axis L1. Thus, even when the push operation unit 80 is operated diagonally to the perpendicular line Lp, rotation moment will not be generated by the force applied to the push operation unit 80 as long as the force does not exceed the resistance of the detent mechanism 60.

The advantages of the present embodiment will now be described.

(1) The switch device 10 includes the switch body 11, which is arranged at the back side of the irregularly-shaped steering unit 1, and the lever unit 12, which is attached to the switch body 11 to allow for switching by a pivotal operation about the first axis L1, which extends in the axial direction of the steering shaft 2. The lever unit 12 includes the lever shaft 13, which extends in a direction intersecting the first axis L1 of the pivotal operation, the lever head 14, which is arranged at the distal end of the lever shaft 13 and has a larger dimension than the diameter of the lever shaft 13, and the push operation unit 80, which allows for switching by a push operation. The push operation unit 80 is arranged so that the operation direction Z1 of the push operation is directed toward the first axis L1. With this structure, force applied to the lever unit 12 when the push operation unit 80 is operated is directed toward the first axis L1. Thus, the force applied to the push operation unit 80 is less likely to pivot the lever unit 12 about the first axis L1. This prevents erroneous operation of the lever unit 12 when the push operation unit 80 is operated.

(2) The lever head 14 is shaped to extend from the lever shaft 13 toward opposite sides in a direction intersecting the axial direction of the lever shaft 13. The push operation unit 80 is arranged on the top surface 14b of the lever head 14. With this structure, the push operation unit 80 can be arranged on a surface of the lever head 14 that allows for easy operation.

(3) The lever shaft 13 includes the base 16, which extends in a direction intersecting the first axis L1, and the arm 17, which is arranged on the base 16 and extends from the back side toward the front side of the irregularly-shaped steering unit 1. With this structure, the lever head 14 is arranged near the grip 5 of the irregularly-shaped steering unit 1. This improves operability.

(4) The switch device 10 includes the detent mechanism 60, which produces resistance against a pivotal operation about the axis of the steering shaft 2, that is, a pivotal operation about the first axis L1. With this structure, the position of the lever unit 12 is maintained by resistance acting about the first axis L1. This prevents erroneous operations.

(5) The push operation unit 80 is arranged so that the operation direction Z1 of a push operation coincides with the perpendicular line Lp connecting the push operation unit 80 and the first axis L1. With this structure, when the push operation unit 80 is operated, force acts along the first axis L1. Thus, the force applied to the push operation unit 80 does not generate rotation moment in the circumferential direction about the first axis L1. This is further advantageous for preventing erroneous operations.

(6) The switch body 11 is rotatable integrally with the irregularly-shaped steering unit 1. With this structure, the switch body 11 can be applied to the switch device 10 that is rotated integrally with the irregularly-shaped steering unit 1.

The present embodiment may be modified as follows. The present embodiment and the following modifications can be combined as long as the combined modifications are not in contradiction.

Push Operation Unit 80

The push operation unit 80 may be arranged so that its operation direction Z1 does not correspond to the perpendicular line Lp. The push operation unit 80 may be arranged so that angle φ formed by the perpendicular line Lp and the operation direction Z1 is set in the predetermined angular range. That is, the operation direction Z1 only needs to be directed toward the first axis L1.

The position of the push operation unit 80 in the circumferential direction about the steering shaft 2 and the operation direction Z1 are not limited to the present embodiment. The push operation unit 80 may be arranged sideward from the steering shaft 2 and operated in the width direction.

The lever head 14 may include one, two, three, or more push operation units 80.

There is particularly no limitation to the switching functionality assigned to the push operation unit 80.

Switch Body 11

Figure 15A:
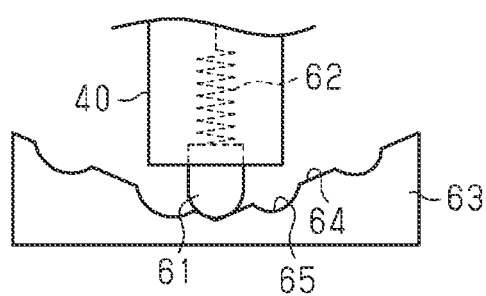
FIG. 15A is a schematic diagram illustrating the movement of the detent mechanism according to another embodiment.
Figure 15B:
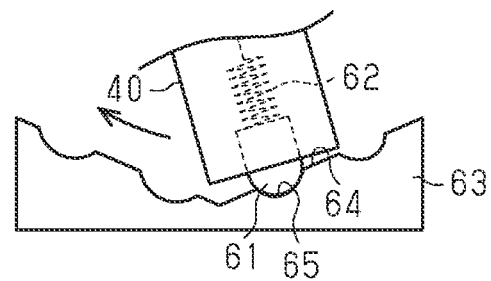
FIG. 15B is a schematic diagram illustrating the movement of the detent mechanism according to another embodiment.

As shown in FIGS. 15A and 15B, the inclined surface 64 of the detent mechanism 60 may include a recess 65 that holds the lever unit 12 at a predetermined operation angle. The abutment portion 61 when pivoted is fitted into and held in one of the recesses 65 by the urging force of the urging member 62. This holds the lever unit 12 at a predetermined operation angle. Further, when the lever unit 12 is operated against the urging force of the urging member 62 in a state where the abutment portion 61 is fitted into the recess 65, the abutment portion 61 is moved out of the recess 65 to allow the lever unit 12 to be pivoted. That is, the lever unit 12 may be of a stationary type. One or both of the detent mechanism 60 and the detent mechanism 70 may include the recesses 65. The mechanism that holds the lever unit 12 as in a stationary type may be arranged on a member that is separate from the detent mechanisms 60, 70.

The detent mechanisms 60, 70 are not limited to the present embodiment. For example, the detent mechanisms 60, 70 may be arranged on a member that is separate from the first pivoting unit 40 and the second pivoting unit 50.

The switch body 11 may support the lever unit 12 of a momentary type or a stationary type.

The switch body 11 does not need to be covered by the back cover 7 of the irregularly-shaped steering unit 1.

Instead, the switch body 11 may be covered by, for example, a cover of the vehicle such as a column cover. Alternatively, the switch body 11 may form part of a shell of the back side of the irregularly-shaped steering unit 1. The upper case 21 and the lower case 22 may be arranged to cover the guard 15 while forming part of the shell of the back side of the irregularly-shaped steering unit 1.

Lever Unit 12

The lever head 14 does not need to be shaped as in the present embodiment. For example, the back surface 14a does not need to be arranged diagonally relative to the axial direction. However, the lever head 14, which is narrowed in the axial direction at the outer side in the width direction, is advantageous in that the lever head 14 when rotated is less likely to hit a leg or the like of the user.

The lever head 14 may include multiple displays 18. For example, the lever head 14 may include one, two, three, or more displays 18. The display 18 does not need to be arranged on an exposed front portion of the lever head 14. The display 18 may be arranged on the top surface of the lever head 14.

The lever head 14 does not need to include the display 18.

The lever head 14 may extend in the same direction as the operation directions for the lever unit 12 such as the axial direction or the height direction. That is, the lever head 14 may be shaped to be larger than the diameter of the lever shaft 13. The diameter of the lever shaft 13 is, for example, the dimension of the lever shaft 13 in the direction that intersects the direction in which the lever shaft 13 extends.

The arm 17 of the lever shaft 13 does not need to extend from the back side toward the front side in the axial direction. Instead, the lever shaft 13 may extend from the front side toward the back side.

The lever unit 12 does not need to be arranged at the back side of the irregularly-shaped steering unit 1. Instead, the lever unit 12 may be arranged at any other location such as on a side surface or a front surface.

The lever unit 12 may project in the height direction or the width direction of the irregularly-shaped steering unit 1 in a front view.

The lever unit 12 may be arranged at any position in the circumferential direction about the irregularly-shaped steering unit 1.

The connection direction A of the lever unit 12 and the switch body 11 is not limited to the present embodiment. The connection direction A may extend in the radial direction of the steering shaft 2.

The bending of the base 16 is not limited to the present embodiment. The base 16 may be bent in the width direction from the connection direction A.

Others

The irregularly-shaped steering unit 1 does not need to include two switch devices 10. Instead, the irregularly-shaped steering unit 1 may include, for example, one switch device 10 or three or more switch devices 10.

The switch device 10 may be arranged at only one side of the irregularly-shaped steering unit 1. That is, the switch devices 10 do not need to be arranged in a symmetrical manner.

The steering unit is not limited to the irregularly-shaped steering unit 1. The steering unit may be a circular steering unit.

The switch device 10 does not need to be arranged integrally with the steering unit. Instead, the switch device 10 may be arranged to move relative to the steering unit in the same manner as a known lever combination switch.

The various types of switching functionalities of the switch device 10 may include functionalities other than those described in the embodiment.

Switching of various types of switching functionalities may use various types of switches such as a tactile switch and a toggle switch. That is, there is particularly no limitation to the first contact point 81, the second contact point 82, and the third contact point 83. The various types of switches may include sensors.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A lever switch device including multiple switching functionalities for operating multiple vehicle onboard units, the lever switch device comprising:
    a switch body arranged at a back side of a steering unit that is rotated from a neutral position to steer a vehicle; and
    a lever unit attached to the switch body to allow for switching by a pivotal operation away from an unpivoted position about a lever unit pivot axis that extends parallel to an axial axis of a rotary shaft of the steering unit,
    wherein the lever unit includes a lever shaft and a lever head, the lever head having a larger dimension than a diameter of the lever shaft,
    wherein the lever shaft includes a base and an arm, the lever head disposed at a distal end of the arm;
    wherein, when the steering unit is in the neutral position and the lever unit is in the unpivoted position, the base extends upwards from the switch body to the arm and the arm extends from the base along a central axis parallel to the axial axis of the rotary shaft to the lever head;
    a push operation unit arranged on a topmost surface of the lever head to allow for switching by a push operation, and
    wherein the push operation unit is arranged so that an operation direction of the push operation is directed toward the lever unit pivot axis.

2. The lever switch device according to claim 1, wherein the lever head is shaped to extend from the arm toward opposite sides in a direction intersecting the central axis of the arm.

3. The lever switch device according to claim 1, further comprising a detent mechanism that produces resistance against the pivotal operation of the lever unit about the lever unit pivoty axis.

4. The lever switch device according to claim 1, wherein the push operation unit is arranged so that the operation direction of the push operation coincides with a line connecting the push operation unit and the lever unit pivot axis.

5. The lever switch device according to claim 1, wherein the switch body is rotatable integrally with the steering unit.

\* \* \* \* \*